(12) United States Patent
Ansari et al.

(10) Patent No.: US 7,903,621 B2
(45) Date of Patent: Mar. 8, 2011

(54) SERVICE EXECUTION USING MULTIPLE DEVICES

(75) Inventors: Mohammed I. Ansari, San Diego, CA (US); Lovleen Chadha, San Diego, CA (US)

(73) Assignee: Siemens Aktiengesellschaft, Munich (DE)

( * ) Notice: Subject to any disclaimer, the term of this patent is extended or adjusted under 35 U.S.C. 154(b) by 1200 days.

(21) Appl. No.: 11/117,945

(22) Filed: Apr. 29, 2005

(65) Prior Publication Data
US 2006/0245383 A1 Nov. 2, 2006

(51) Int. Cl.
*H04W 4/00* (2009.01)
*H04M 3/00* (2006.01)
*G06F 15/16* (2006.01)

(52) U.S. Cl. .................... 370/338; 455/419; 709/208
(58) Field of Classification Search ............ 370/310, 370/328, 338; 455/418–420; 709/208, 217, 709/219
See application file for complete search history.

(56) References Cited

U.S. PATENT DOCUMENTS

| 2003/0054794 A1* | 3/2003 | Zhang | 455/403 |
| 2006/0007900 A1* | 1/2006 | Sylvain | 370/338 |
| 2006/0140135 A1* | 6/2006 | Bonta et al. | 370/254 |

OTHER PUBLICATIONS

"Understanding Universal Plug and Play", Microsoft® Windows® Me Millennium Edition, White Paper. 45pgs.

* cited by examiner

*Primary Examiner* — Michael T Thier
(74) *Attorney, Agent, or Firm* — Staas & Halsey LLP

(57) ABSTRACT

A system includes determination of a service to perform with respect to data stored in the device, determination of a plurality of sub-services corresponding to the service, determination of an execution sequence for the plurality of sub-services, communication of the execution sequence to each of a plurality of local external devices, each of the plurality of local external devices to perform at least one of the plurality of sub-services in accordance with the execution sequence, and transmission of the data to at least a first of the plurality of local external devices.

12 Claims, 15 Drawing Sheets

SERVICE EXECUTION USING MULTIPLE DEVICES

BACKGROUND

1. Field

Embodiments may relate to multi-device communications. More particularly, some embodiments are concerned with the execution of services by multiple devices to achieve a desired end.

2. Description

Many types of electronic devices are currently available to consumers. A non-exhaustive list of such devices includes desktop computers, laptop computers, mobile telephones, personal digital assistants (PDAs), wireless email devices, and digital media players. Some of these devices are intended to provide several services (e.g., desktop computers and laptop computers), while others are associated with a "core" service (e.g., mobile telephones, personal digital assistants (PDAs), wireless email devices, and digital media players). Regardless, most electronic devices are capable of providing two or more services.

Conventionally, most electronic devices operate in a standalone mode that does not allow for interaction with other devices. It has been desired to network these devices so that services of one device may be provided to one or more other devices. Network protocols that provide discoverable device services have therefore been proposed.

The Universal Plug and Play (UPnP) protocol has been defined by companies and individuals comprising the UPnP Forum. UPnP is designed to provide automatic discovery and efficient usage of services offered by many different types of networked devices. More particularly, a device may use UPnP to dynamically join a network, obtain an IP address, convey its services, determine the services of other devices on the network, and access the services of the other devices.

Network protocols such as UPnP allow a device to access a service of another device. However, such protocols do not provide an efficient system to access services of several devices in order to achieve a given end result. Improved management and control of shared services is therefore desired.

SUMMARY

Embodiments may provide a system, device, method, program code and/or means to determine a service to perform with respect to data stored in a device, determine a plurality of sub-services corresponding to the service, determine an execution sequence for the plurality of sub-services, communicate the execution sequence to each of a plurality of local external devices, each of the plurality of local external devices to perform at least one of the plurality of sub-services in accordance with the execution sequence, and transmit the data to at least a first of the plurality of local external devices.

In some aspects, determination of the plurality of sub-services includes determination of a set of sub-services available to the device from a set of local external devices, determination of sub-services provided by the device, and determination of the plurality of sub-services based on the service, the set of sub-services, and the sub-services provided by the device.

Further aspects of some embodiments may include determination unavailability of one of the plurality of local external devices, determination of a local external device to provide one or more sub-services to have been performed by the unavailable one of the plurality of local external devices, determination of a new execution sequence for the plurality of sub-services, and communication of the new execution sequence to the determined local external device and the plurality of local external devices to perform at least one of the plurality of sub-services in accordance with the new execution sequence.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein.

DETAILED DESCRIPTION

Figure 1:
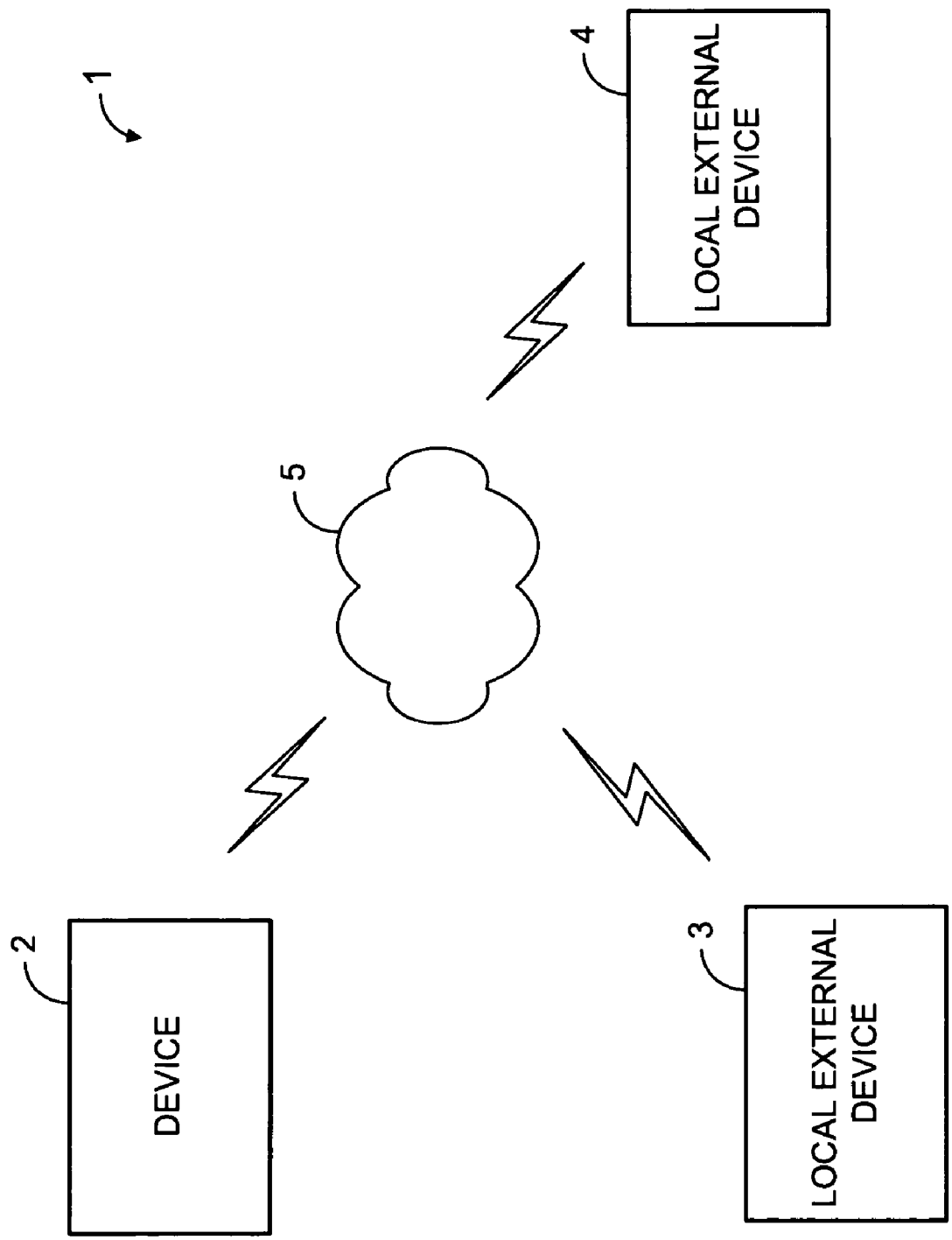
FIG. 1 is a diagram of a system according to some embodiments.

FIG. 1 is a diagram of system 1 according to some embodiments. System 1 of FIG. 1 includes device 2, local external device 3, local external device 4, and communication network 5.

According to some embodiments, device 2 determines a service to perform with respect to data stored in device 2, determines a plurality of sub-services corresponding to the service, determines an execution sequence for the plurality of sub-services, and communicates the execution sequence to each of local external devices 3 and 4, wherein each of local external devices 3 and 4 is to perform at least one of the plurality of sub-services in accordance with the execution sequence. Next, device 2 transmits the data to at least one of local external devices 3 and 4. Embodiments of the foregoing may provide efficient access to and execution of a service composed of several sub-services that are provided by several external devices.

Device 2 and local external devices 3 and 4 may comprise any one or more electronic devices. Examples include but are not limited to a mobile telephone, a desktop computer, a laptop computer, a handheld computer, a PDA, a digital media player, a digital camera, a wireless email device, and any other electronic device or devices that may process, transmit and receive data. Such transmission may be performed using any transmission system that is or becomes known.

In this regard, communication network 5 provides communication between the devices of system 1. Communication network 5 may comprise any number of different systems for transferring data, including a Local Area Network (LAN), a Metropolitan Area Network (MAN), a Wide Area Network (WAN), a proprietary network, a Public Switched Telephone Network (PSTN), a Wireless Application Protocol (WAP) network, a wireless LAN (e.g., in accordance with the Institute of Electrical and Electronics Engineers 802.11 standard), a Bluetooth network, an Infrared Radiation (IR) network, and/or an IP network such as the Internet, an intranet or an extranet. The physical layers utilized by these systems may include one or more of any readable medium for transferring data, including coaxial cable, twisted-pair wires, fiber-optics, RF, infrared and the like. Accordingly, communications referred to herein may include wired and/or wireless communications as appropriate.

The devices of system 1 may communicate differently than as illustrated. For example, any combination of wired or wireless connections may be used, with some devices being in direct communication with one another and/or in communication with network 5 via multiple network connections. Although the illustrated communication links appear dedicated, it should be noted that each of the links may be shared by other devices. Moreover, communication between devices may be established when necessary and severed at other times or always available but rarely used to transmit data.

Figure 2:
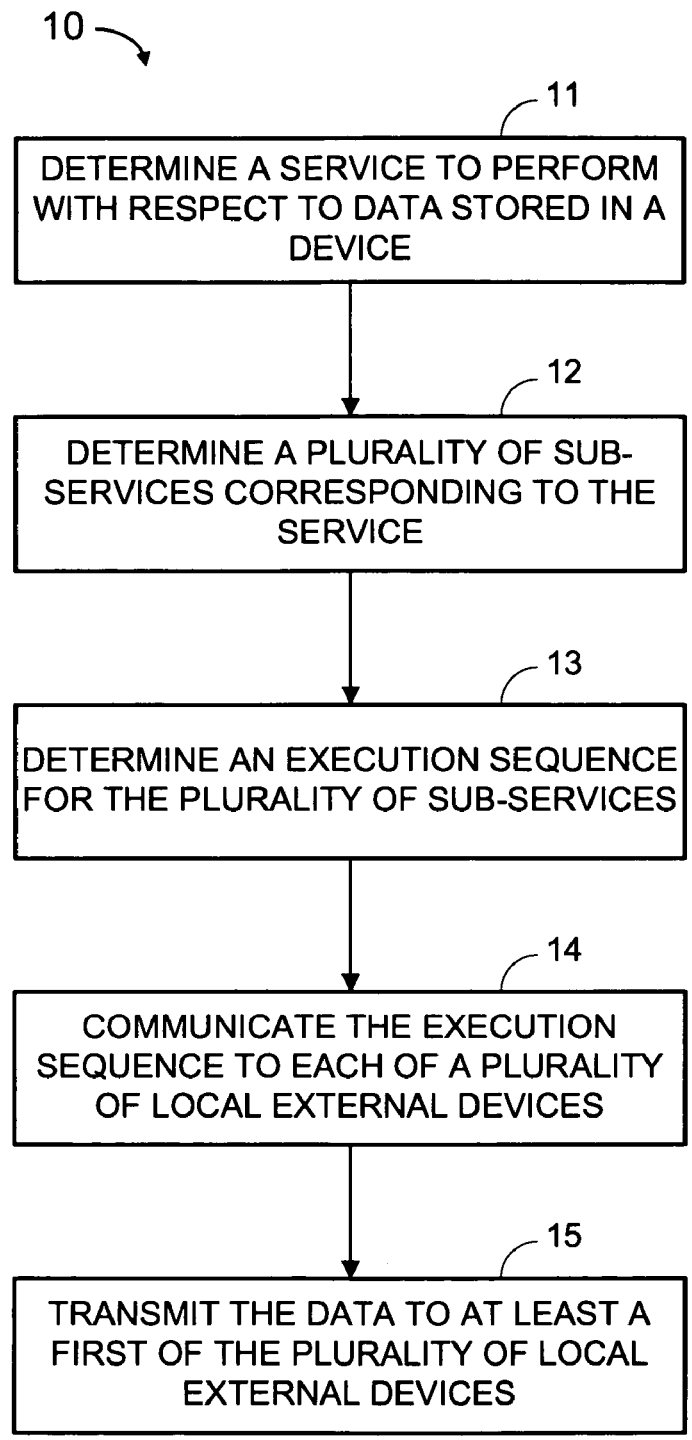
FIG. 2 is a flow diagram of a process according to some embodiments.

FIG. 2 is a flow diagram of process 10 according to some embodiments. Process 10 may be embodied in program code and/or executed by device 2 or another device using any suitable hardware and/or software arrangement. Process 10 will be described briefly below, with more detailed examples of some embodiments to be provided thereafter.

A service is initially determined at step 11. The service is to be performed with respect to data stored in device 2. In the present example, the data is an image file stored in device 2, and the desired service is transmission of the image file to an email address. It will be assumed for the present example that device 2 comprises a mobile telephone that has captured the image file using an included digital camera function of the mobile telephone.

Next, at step 12, device 2 determines a plurality of sub-services corresponding to the desired service. For example, device 2 might not provide native capability to transmit an email. Device 2 therefore determines at step 12 the sub-services it might require in order to transmit the email.

Step 12 may proceed in any number of manners. Device 2 may store a list of sub-services corresponding to a desired service. The list may be based on sub-services provided by device 2. In one example, device 2 provides IR communication and therefore the list indicates that IR reception, Internet communication, and an email client are sub-services corresponding to the desired email service. Device 2 may then use any device and service discovery protocol (e.g., UPnP) to determine that each of the corresponding sub-services is provided by one or more local external devices.

In some embodiments, step 12 initially includes discovery of available devices and sub-services via a discoverable network protocol. After discovering the available sub-services, device 2 may determine a combination of the available sub-services that will provide the desired service. For example, device 2 may determine that device 3 provides IR and Bluetooth communication, and that device 4 provides Bluetooth communication, a Broadband connection, and an email client. Accordingly, device 2 determines each of the foregoing sub-services at step 12.

The foregoing discovery protocols may rely on queries and responses that are sent between devices. All inter-device communication described herein may occur directly between devices and/or over a network such as communication network 5.

An execution sequence for the determined sub-services is determined at step 13. The execution sequence indicates an order in which the sub-services are to be performed so as to result in the desired service. Continuing with the latter example, the execution sequence may indicate that device 3 is to receive a digital image from device 2 via IR and to then transmit the image to device 4 via Bluetooth. The execution sequence may further indicate that device 4 is to receive the image via Bluetooth, encapsulate the image in an email message and pass the email message to the Broadband connection via the email client, and to finally transmit the email message over the Internet via the Broadband connection.

The determined execution sequence is communicated to each of the local external devices at step 14. According to some embodiments of step 14, data indicating the entire execution sequence is transmitted from device 2 to device 3 and from device 2 to device 4. Some embodiments include transmission to a local external device of only a portion of the execution sequence that relates to the local external device. According to these latter embodiments, device 2 may transmit an execution sequence to device 3 that only indicates that device 3 is to receive a digital image from device 2 via IR and to then transmit the image to device 4 via Bluetooth. Device 2 may then also transmit an execution sequence to device 4 that only indicates that device 4 is to receive the image via Bluetooth, encapsulate the image in an email message, pass the email message to the Broadband connection, and transmit the email message over the Internet via the Broadband connection.

In some embodiments of step 14, device 2 communicates an execution sequence "list" to a first of the local external devices. For example, device 2 may communicate a list to device 3 that specifies the execution sequence of sub-services and the devices associated with each sub-service. After executing the sub-services associated with itself, device 3 deletes itself and its associated sub-services from the list and forwards the revised list to the next device (i.e., device 4) in the execution sequence. Device 4 proceeds similarly, executing its sub-services and then deleting itself from the list. Such a process is not limited to two local external devices.

At step 15, the data is transmitted to at least a first of the plurality of local external devices. In the present example, the image file is transmitted from device 2 to device 3 at step 15. Device 3 acts on the image file according to the determined execution sequence, and device 4 then receives the image file and acts on the image file according to the determined execution sequence.

The data may be transmitted in some embodiments of step 15 by transmitting a set of nested function calls to the first of the plurality of local external devices. With reference to system 1, such embodiments may be implemented by transmitting the function: (device 2 calls device 3 calls device 4).

These embodiments may be particularly useful in which the originating device (e.g., device 2) requires a result of the execution sequence. Such a result may comprise a computation result, data in a converted format, or simply a confirmation of successful sub-service execution.

Figure 3:
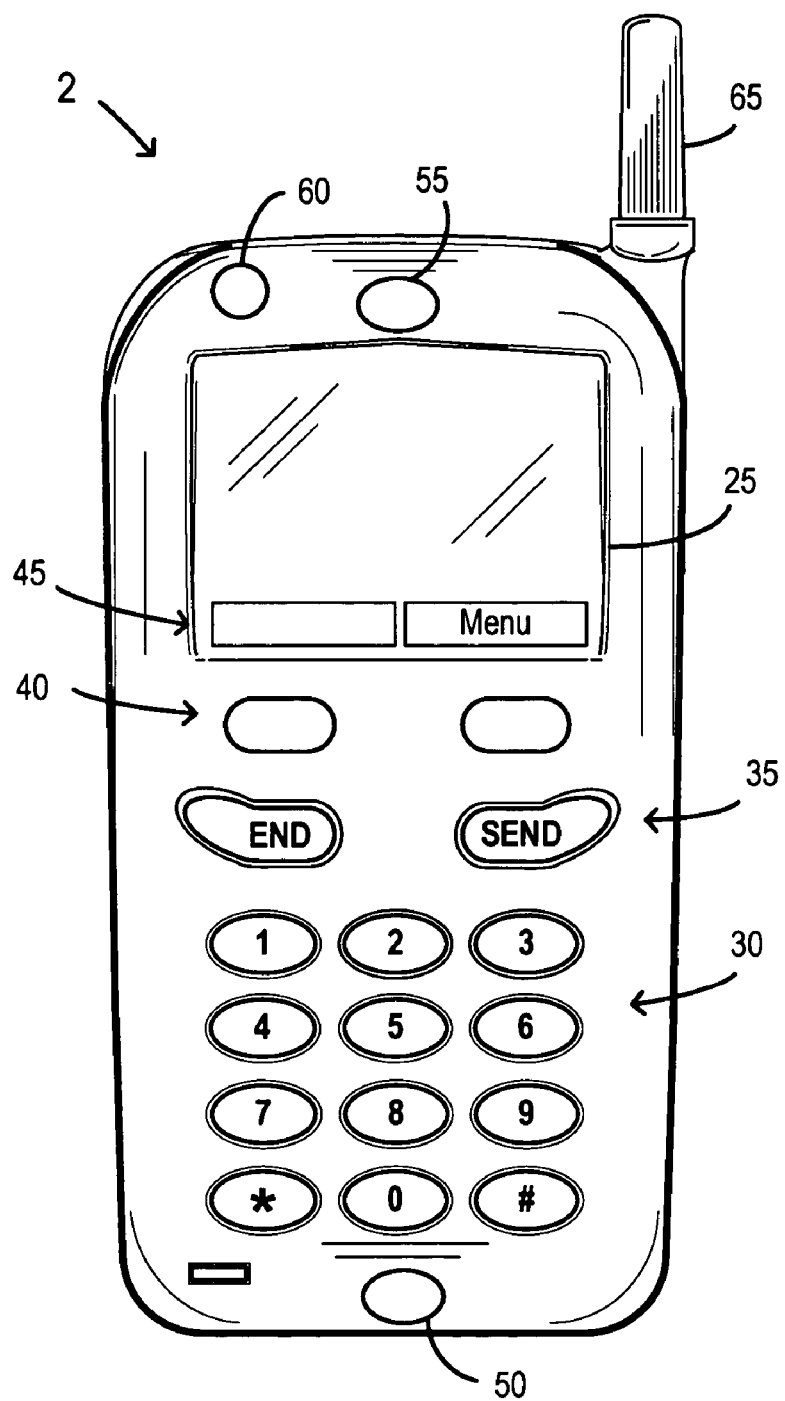
FIG. 3 is an outward view of a mobile telephone according to some embodiments.

FIG. 3 is an outward view for explaining some elements of device 2 according to some embodiments. Device 2 of FIG. 3 comprises a mobile telephone and may execute process 10 according to some embodiments. Device 2 may include conventional components, and may include program code for performing certain functions described herein. Some embodiments of device 2 may differ in part or in whole from that illustrated in FIG. 3 and described below.

Device 2 may be compatible with one or more cellular communication protocols. Examples of such protocols include but are not limited to CDMA, Time Division Multiple Access (TDMA) (e.g., GSM, D-AMPS), and CDMAOne (e.g., PCS). Embodiments are not limited to devices offering cellular and/or telephone functionality.

Device 2 includes display 25, keypad 30, fixed function keys 35, variable function keys 40, function key labels 45, microphone 50, speaker 55, power button 60 and antenna 65. Display 25 may present a user interface for receiving commands and data from a user. Alphanumeric keypad 30 is laid out in a conventional telephone keypad format, and fixed function keys 35 are used to initiate and terminate communication. Variable function keys 40 provide functions that vary in accordance with function labels 45 displayed on display 25 above keys 40.

Microphone 50 receives audio signals from a user. The signals may comprise speech to be transmitted to a call recipient. The audio signals may also or alternatively comprise commands for operating device 2.

Speaker 55 emits audio signals from device 2. The audio signals may comprise ring tones, beeps, alarms, and other tones used during operation of device 2, and/or speech or other audio signals received from another device such as another telephone. Speaker 55 may also emit audio signals representing speech or other sounds received by microphone 50.

Power button 60 may be used to turn device 2 on and off. Antenna 65 may receive and transmit radio frequency signals from and to a cellular telephone network. Antenna 65 may be configured to transmit and receive any types of signals, including but not limited to IR and Bluetooth signals.

In some examples of operation, a user operates keys 40 to access a function provided by device 2. Functions according to some embodiments may include a dialing function, an address book function, a service discovery function, a game function, and a settings function. Device 2 may provide any mobile telephone function that is or becomes known.

Figure 4:
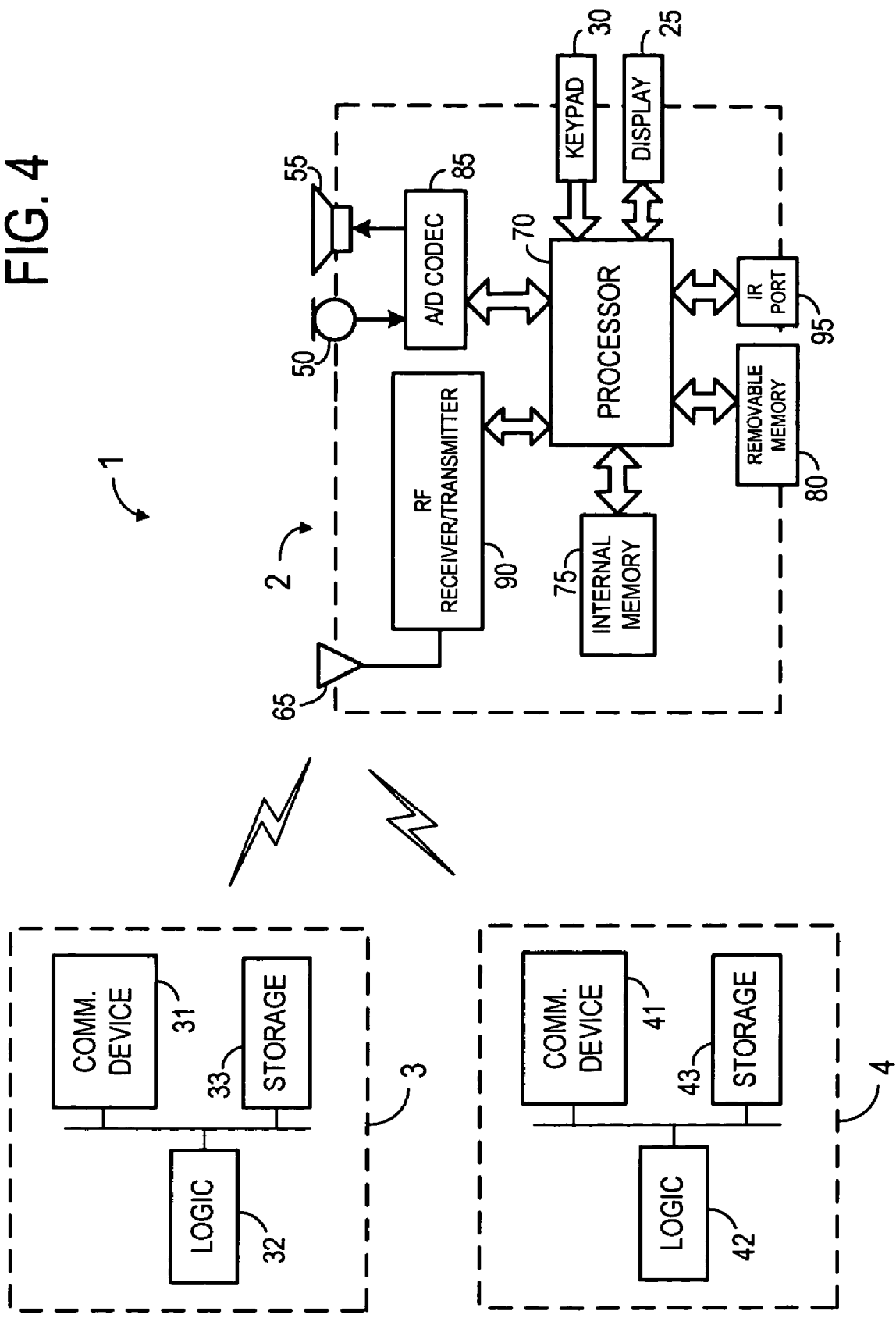
FIG. 4 is a block diagram of the internal architecture of a system according to some embodiments.

FIG. 4 is a diagram of system 1 including the internal architecture of device 2 according to some embodiments. FIG. 4 also includes block diagrams of local external device 3 and local external device 4 according to some embodiments.

The illustrated embodiment of device 2 includes processor 70, which may be a conventional microprocessor, microcontroller and/or digital signal processor (DSP) or other control circuit conventionally provided in a mobile telephone. Processor 70 is shown in communication with keypad 30 and display 25 for control thereof.

Device 2 also includes internal memory 75 and removable memory 80. Internal memory 75 may include one or more of ROM (read only memory), RAM (random access memory, e.g., static RAM), and flash memory. Removable memory 80 may comprise a flash memory, a Subscriber Identity Module (SIM) card or any other removable memory that is or becomes known. Device 2 may therefore be equipped with an interface for physically receiving and transferring data to and from removable memory 80.

Memories 75 and 80 may store program code that is executable by processor 70 to control device 2. The program code may include but is not limited to operating system program code, application program code, device driver program code, and database connector program code. The program code may include code to cause device 2 to perform functions that are described herein.

Memories 75 and 80 may also store data used in the operation of device 2. The data may be accessed by processor 70 during operation of device 2. Such data may include contact information comprising phone numbers, post addresses, and email addresses. The data may also include text files, image files, audio files, access codes, and any other suitable data. Some or all of the data may be read-only, while other of the data may be rewritable.

Analog/digital coder/decoder (A/D codec) 85 is also in communication with processor 70. A/D codec 85 may receive analog signals from microphone 50, convert the analog signals to digital signals, and pass the digital signals to processor 70. Conversely, processor 70 may transmit digital signals to A/D codec 85, which converts the digital signals to analog signals and passes the analog signals to speaker 55. Speaker 55 then emits sound based on the analog signals.

RF receiver/transmitter 90 is a communication device operatively coupled to antenna 65. RF receiver/transmitter 90 may, in accordance with conventional practices, comprise a combination of two or more different receive/transmit modules (not separately shown) that operate in accordance with mutually different radio communication protocols to provide various services for the device 2. For example, receiver/transmitter 90 may operate in accordance with one radio communication protocol to provide conventional two-way service for device 2, and may operate in accordance with another radio communication protocol to provide PoC service for device 2.

Receiver/transmitter 90 may comprise any element or elements for transmitting data to and/or receiving data from a local external device. Examples include but are not limited to an infrared port and a USB port.

Local external device 3 of the illustrated embodiment includes communication device 31, logic 32 and storage 33. Local device 3 may include more or fewer elements than those illustrated.

Communication device 31 may comprise any device to receive communications from and transmit communications to device 2. Examples of communication device 31 according to some embodiments include an infrared port, an RF antenna, and a serial port. Communication device 31 is in communication with logic 32. Logic 32 may comprise any suitable combination of discrete logic, microprocessor, microcontroller and other hardware used to impart functionality to device 3. Logic 32 may operate based on executable code stored in storage 33. Such code may include code to implement a device and service discovery protocol, and other applications suitable for local external device 3.

Storage 33 may comprise any one or more types of electronic storage. Examples include hard disks, RAM, ROM, and removable storage such as Flash or other removable disks. Storage 33 may store data files, application files, operating system files and device drivers used to operate unshown elements of local external device 3.

Local external device 4 of FIG. 4 includes communication device 41, logic 42 and storage 43. Local external device 4 may comprise a device that differs from local external device 3 in any number of ways. However, elements 41 through 43 may share the general description provided above with respect to respective identically-named elements of local external device 3 of FIG. 4.

Those in the art will understand that the block diagram of FIG. 4 is simplified in a number of ways. For example, all power and power management components of devices 2 through 4 are omitted from the diagram. Also, some embodiments may employ internal architectures somewhat or completely different from those shown in FIG. 4.

Figure 5:
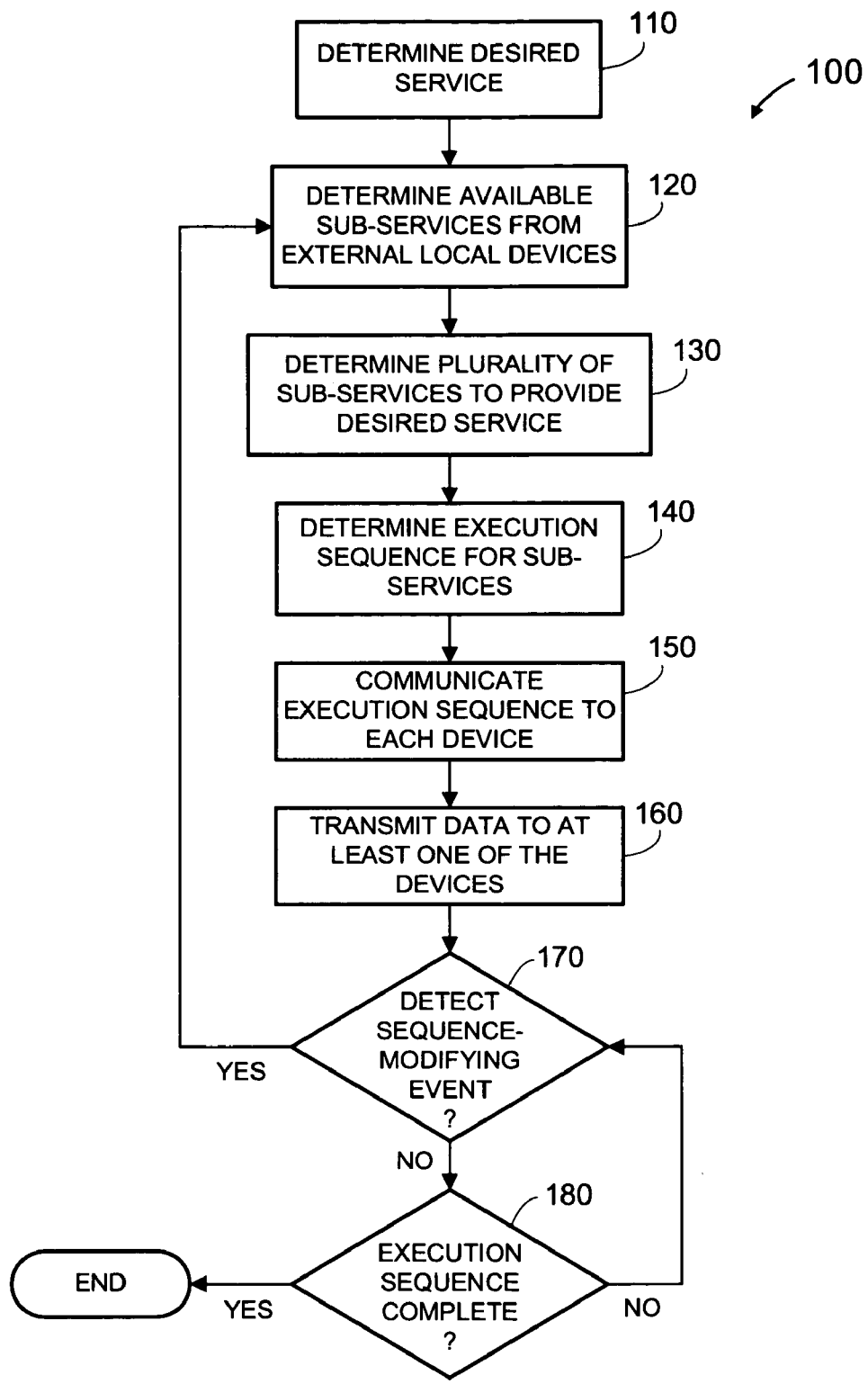
FIG. 5 is a flow diagram of a process according to some embodiments.

FIG. 5 is a flow diagram of process 100 according to some embodiments. Process 100 may be embodied in hardware and/or software of device 2, local external device 3 and 4, and/or one or more other suitable devices. In the foregoing description, process 100 will be described as if embodied in program code of a "plug-in" application stored in internal memory 75 and executed by processor 70 of device 2.

Figure 6:
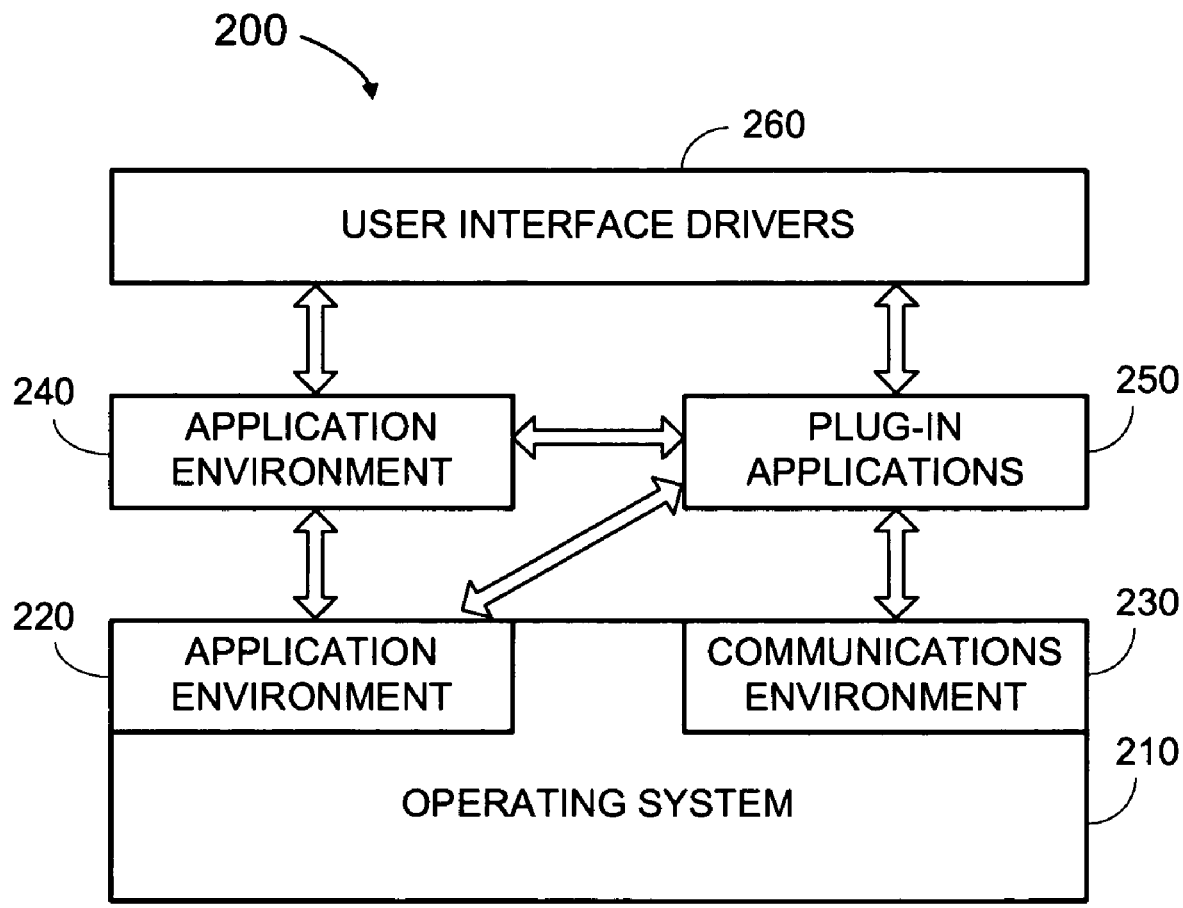
FIG. 6 is a block diagram of a software architecture according to some embodiments.

In this regard, FIG. 6 is a block diagram of a general software architecture that may support applications within device 2 in conjunction with some embodiments. Architecture 200 includes operating system 210, which may comprise the Symbian® mobile telephone operating system. Any suitable operating system may be used in conjunction with some embodiments, including those not intended and/or usable with mobile telephones. Suitable operating systems according to some embodiments include but are not limited to Palm OS™, Windows CE™, and operating systems suitable for portable devices capable of transmissions to an external device (e.g., PDAs, digital media players, etc.).

Application environment 220 provides a platform by which another application environment 240 may interface with operating system 210. In this regard, application environment 240 may comprise a Java™ or C programming environment. As such, plug-in applications 250 may be written in Java or C for execution by device 2. Plug-in applications 250 may also be written for the application interface provided by application environment 220.

Communications environment 230 provides plug-in applications 250 with access to the communications functionality of operating system 210. This functionality may include local wireless communication (e.g., infrared, Bluetooth, etc.), text messaging, email client functions, Web browsing and telephone communication. Plug-in applications 250 may also transmit data and commands to and receive input from user interface drivers 260 for control of the user interfaces of device 2.

Although plug-in applications are specifically mentioned above, some embodiments comprise a standalone contact information client and/or server application that interfaces with application environment 240 and/or application environment 220.

Figure 7:
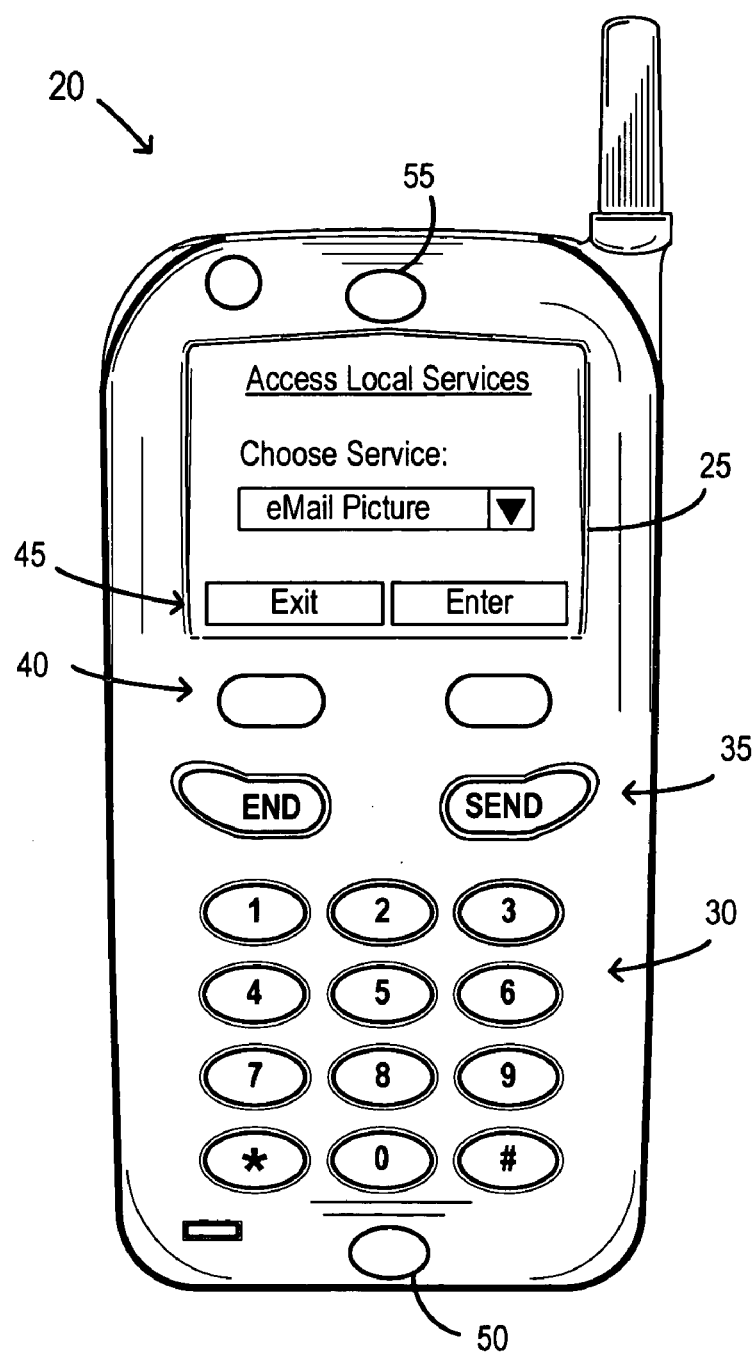
FIG. 7 is an outward view of a mobile telephone according to some embodiments.

Returning to process 100, device 2 determines a desired service at step 110. Prior to step 110, a user may manipulate keypad 30 and variable function keys 40 to enter commands to launch an application for accessing external services. Display 25 may present an interface of the application as a result. FIG. 7 is an outward view of device 2 prior to step 110 according to the foregoing example. As shown, display 25 presents a main interface of an Access Local Services application.

The interface provides a pull-down menu of pre-stored services that may be selected by the user. One or more of the selectable services may comprise services that cannot be performed solely by device 2. The pull-down menu illustrates user selection of an "email picture" service. Accordingly, the "email picture" service is determined in step 110. According to some embodiments, selection of the "email picture" service causes device 2 to present further user interfaces through which the user may specify the picture to be emailed, the email address to which the picture should be transmitted, and other parameters.

At step 120, device 2 then determines available sub-services corresponding to the desired service. In some embodiments, device 2 invokes a device and service discovery protocol to determine the available sub-services at step 120. General operation of the UPnP protocol is described below. Some embodiments may be implemented in conjunction with other components and/or network protocols.

As mentioned above, UPnP allows a physical device (or "apparatus" to use the UPnP terminology) to discover and use services provided by another apparatus. Therefore, each UPnP-enabled physical device of system 1 may discover and use services provided by each other UPnP-enabled physical device.

Figure 8:
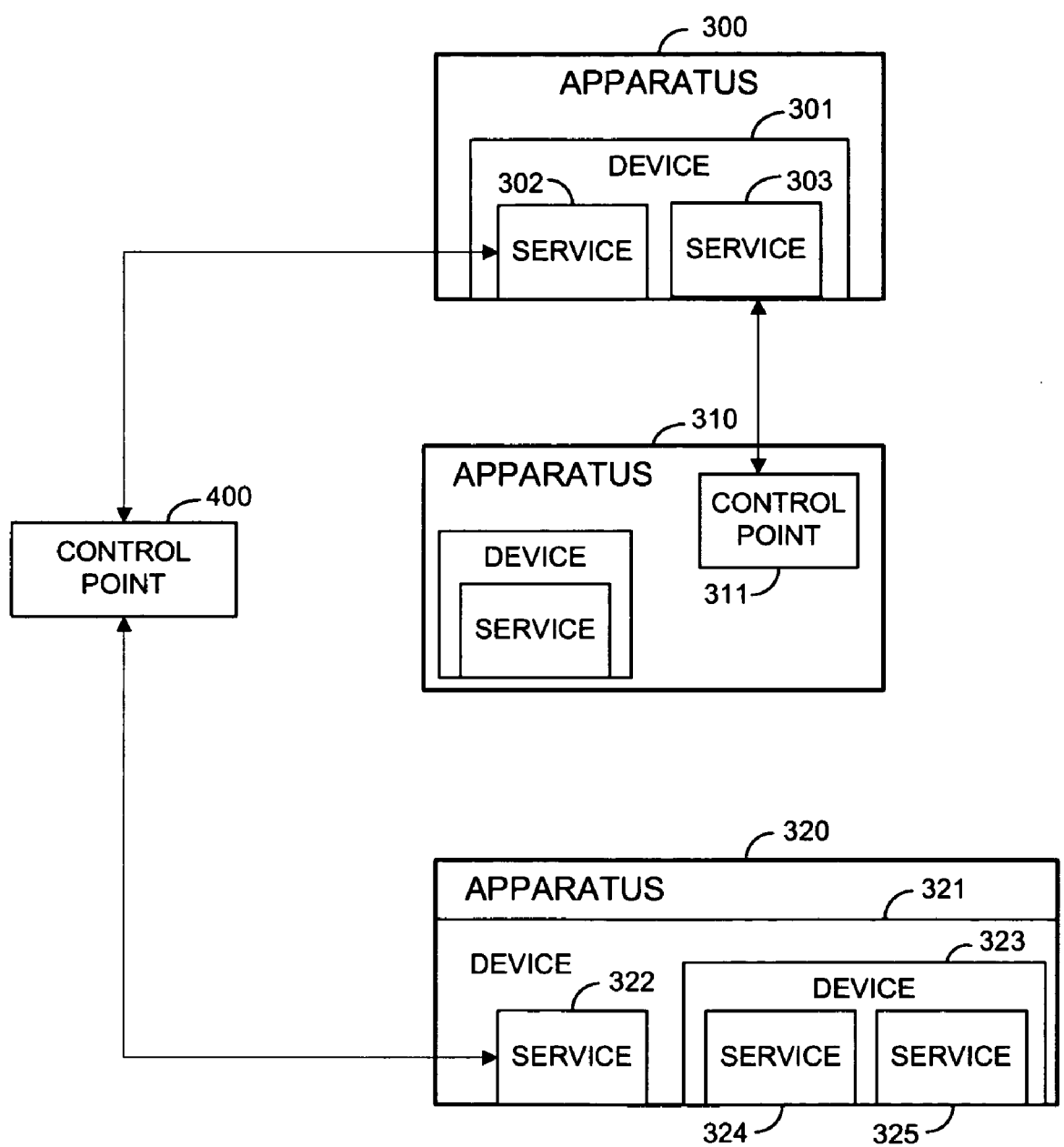
FIG. 8 is a block diagram of network apparatuses and object abstractions according to some embodiments.

FIG. 8 is a block diagram of apparatuses and object abstractions to explain service discovery at step 120 according to some embodiments. Each of apparatuses 300 through 320 represents a physical device, such as a personal computer, a television, a digital camera, or any other suitable unit. Each apparatus includes at least one device object. A device object is an object that is abstracted within an apparatus. A device object may contain services and/or other device objects. A service is an object that is abstracted within a device object.

In one example, apparatus 300 is a videocassette recorder, device 301 is a video cassette recorder device object, service 302 is a tape transport service, and service 303 is a tuner service. In contrast, apparatus 320 may be a combination television/videocassette recorder apparatus that includes television device object 321 and tuner service 322. Television device object 321 may also include videocassette recorder device object 323 and its associated services 324 and 325.

The services provided by a particular type of device object differ among device object types. In this regard, a device object may host an eXtensible Markup Language (XML) description document that describes the services provided by the device object as well as other associated information.

Each service exposes actions to UPnP control points and models its state using state variables. As a particular example, a clock service may provide the actions get_time and set_time, and may model its state using the state variable current_time. The actions and state variables are described by an XML service description document. The aforementioned XML description document includes a pointer to the service description documents of its associated services.

Control point 400 of FIG. 8 is shown in communication with service 302 and service 322. Control point 400 may be embedded in an apparatus such as control point 311 of apparatus 310. As shown, a control point may access actions of services that are embedded in disparate devices objects (and apparatuses).

Therefore, a control point is used to discover and control device objects in a UPnP network. In some embodiments, a control point may discover a device object, receive an XML description associated with the device object, retrieve descriptions of services associated with the device object based on pointers located in the description, invoke actions specified in the service descriptions, and subscribe to events issued by the services. In the latter regard, a service will send an event to the control point when a state of the service changes.

Figure 9:
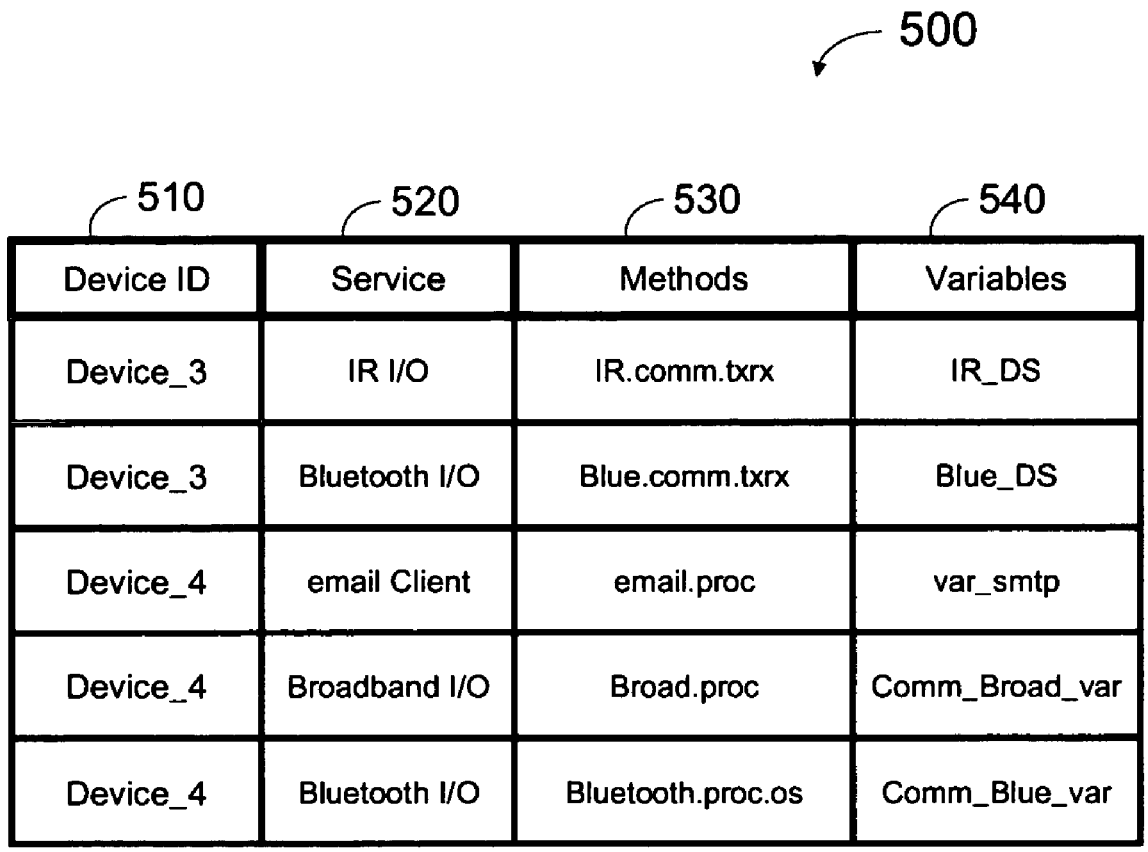
FIG. 9 is a tabular representation of a portion of a data structure according to some embodiments.

According to some embodiments, the discovered services are compiled into a data structure such as that illustrated in FIG. 9. Data structure 500 is shown in a tabular format, although any system for representing relationships between data may be used. Data structure 500 describes sub-services available from local external devices and determined in step 120. Data structure 500 may be stored in memory 75 of device 2 or in any other suitable location.

Data structure 500 includes Device ID field 510, Service field 520, Methods field 530 and Variables field 540. Device ID field 510 of a particular record indicates a device that is associated with the particular record. Fields 520 through 540 respectively specify a service provided by the device, and pointers to methods and variables made available by the service. Data structure 500 may include more or fewer fields than those illustrated.

For simplicity, data structure 500 of FIG. 9 includes only the devices and services mentioned above with respect to process 10. It should be noted that data structure 500 may specify devices in addition to device 3 and device 4 which are associated with unique services, and additional services associated with one or both of device 3 and device 4.

Again returning to process 100, a plurality of sub-services is determined at step 130 from the available sub-services that were determined at step 120. The plurality of sub-services is intended to provide the desired service that was determined at step 110.

Figure 10:
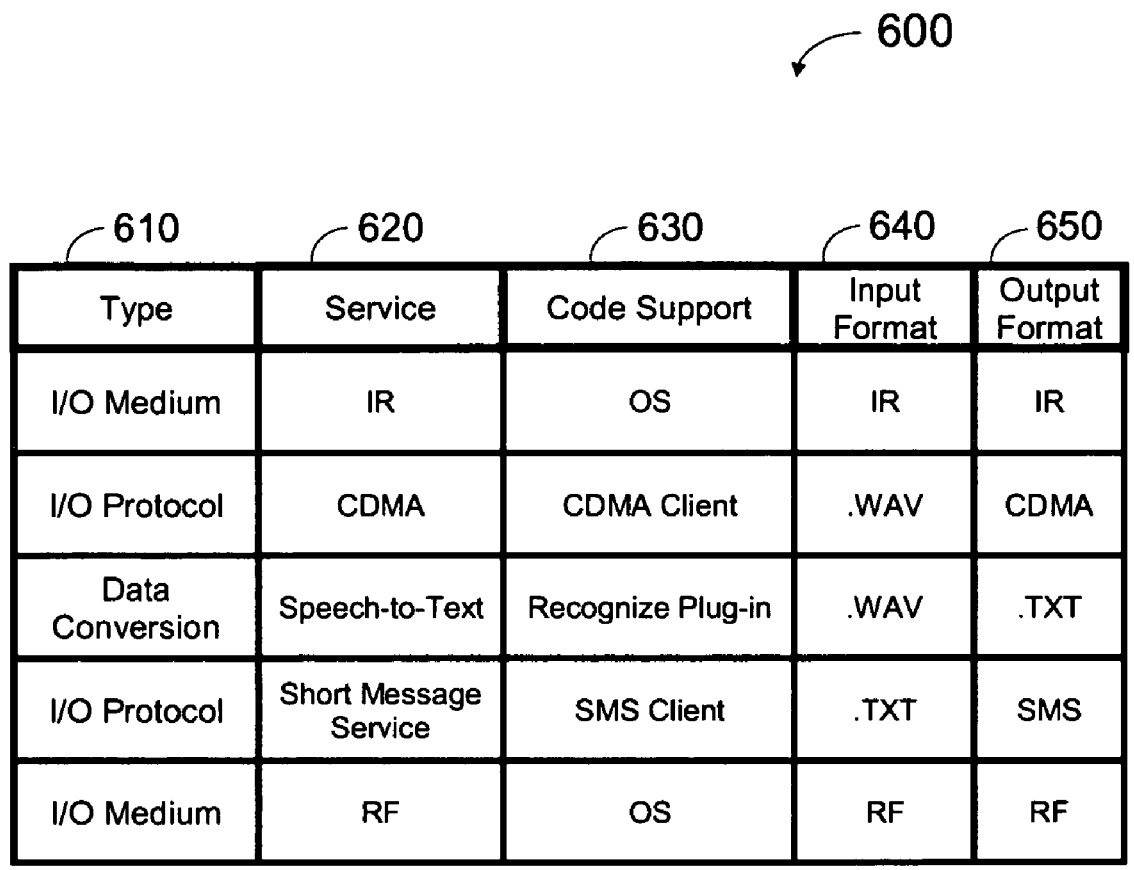
FIG. 10 is a tabular representation of a portion of a data structure according to some embodiments.

Device 2 may use any currently- or hereafter-known method to determine the plurality of sub-services in step 130. The sub-services may be determined based in part on services provided by device 2. Data structure 600 of FIG. 10 may specify services provided by device 2 and may be stored therein according to some embodiments. Data structure 600 includes Service Type field 610, Service field 620, Code Support field 630, Input Format field 640, and Output Format field 650. Code Support field 630 specifies program code that provides an associated service.

Device 2 may store a list of services for display in the pull-down menu of FIG. 7. Each service in the list may be associated with sub-services that are required to provide the service. The required sub-services may depend on the services provided by device 2 and specified in data structure 600. Accordingly, the sub-services are determined from the list in step 130. Any other system for determining sub-services that are required to provide a desired service may be used in conjunction with some embodiments. Flow continues to step 140 after the plurality of sub-services has been determined.

In some embodiments of process 100, step 120 occurs prior to step 110 and step 130 is omitted. As an example of these embodiments, available sub-services are first discovered via a discoverable network protocol. Device 2 then determines one or more services that may be provided using combinations of the discovered sub-services in conjunction with the capabilities of device 2. A user is presented with the one or more services to select a service therefrom and flow proceeds to step 140.

Some embodiments of process 100 execute step 130 prior to step 120. That is, device 2 initially determines a plurality of sub-services needed to provide a service. Device 2 then determines that each of the plurality of sub-services is available from external local devices.

Notwithstanding the foregoing alternative processes, a plurality of sub-services and associated devices are determined by the time flow reaches step 140. An execution sequence for the sub-services is determined at step 140. The execution sequence may specify an order in which the sub-services are to be executed as well as the devices to perform the sub-services.

Figure 11:
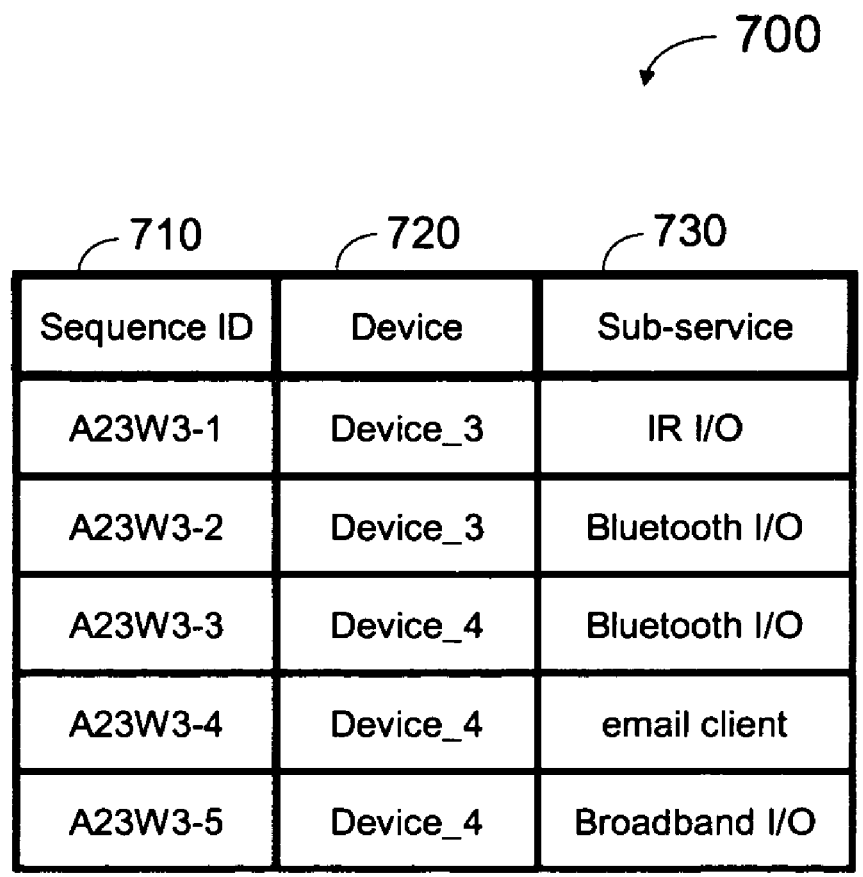
FIG. 11 is a tabular representation of a portion of a data structure according to some embodiments.

Data structure 700 of FIG. 11 indicates an execution sequence according to some embodiments. Sequence ID field 710 provides a unique ID for the execution sequence represented by data structure 700, and also indicates a sequence order for each associated service. Device field 720 specifies the device to execute the sub-service of each record, and Sub-service field 730 indicates the sub-service associated with each record. Any other system for representing an execution sequence may be used in some embodiments.

Figure 12:
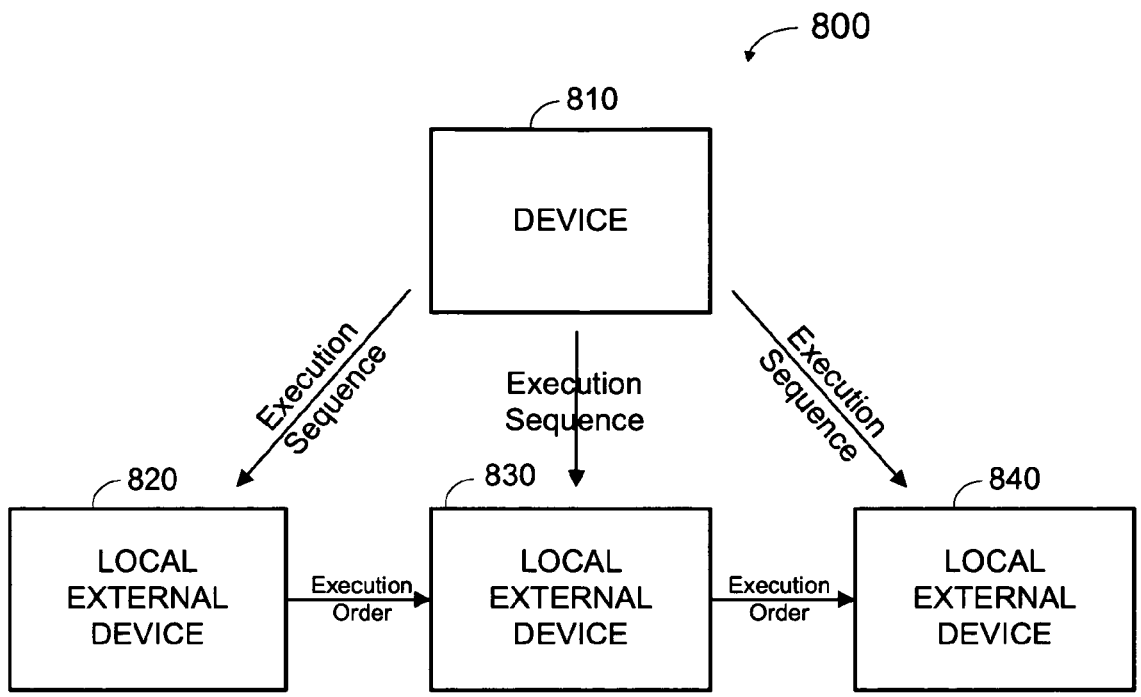
FIG. 12 is a block diagram of a system illustrating execution sequence communication according to some embodiments.
Figure 13:
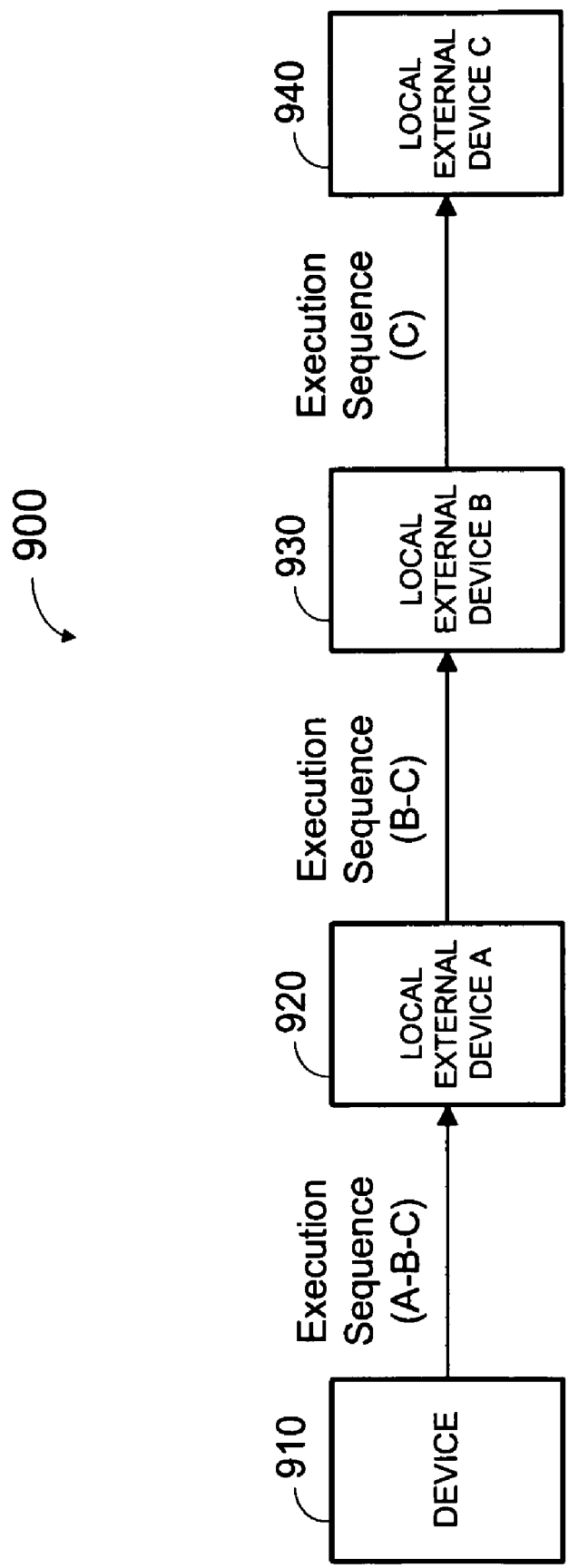
FIG. 13 is a block diagram of a system illustrating execution sequence communication according to some embodiments.

Device 2 communicates the execution sequence to each of the local external devices at step 150. FIG. 12 illustrates system 800 in which device 810 transmits data indicating the entire execution sequence to each local external device that is to execute a sub-service according to some embodiments. In contrast, FIG. 13 illustrates system 900 in which device 910 communicates an execution sequence to device 920 that specifies the execution sequence of sub-services and the devices associated with each sub-service.

After executing the sub-services associated with itself, device 920 deletes itself and its associated sub-services from the execution sequence and forwards the revised sequence to device 930. Device 930 then executes its sub-services, deletes itself from the execution sequence and forwards the revised sequence to device 940.

Figure 14:
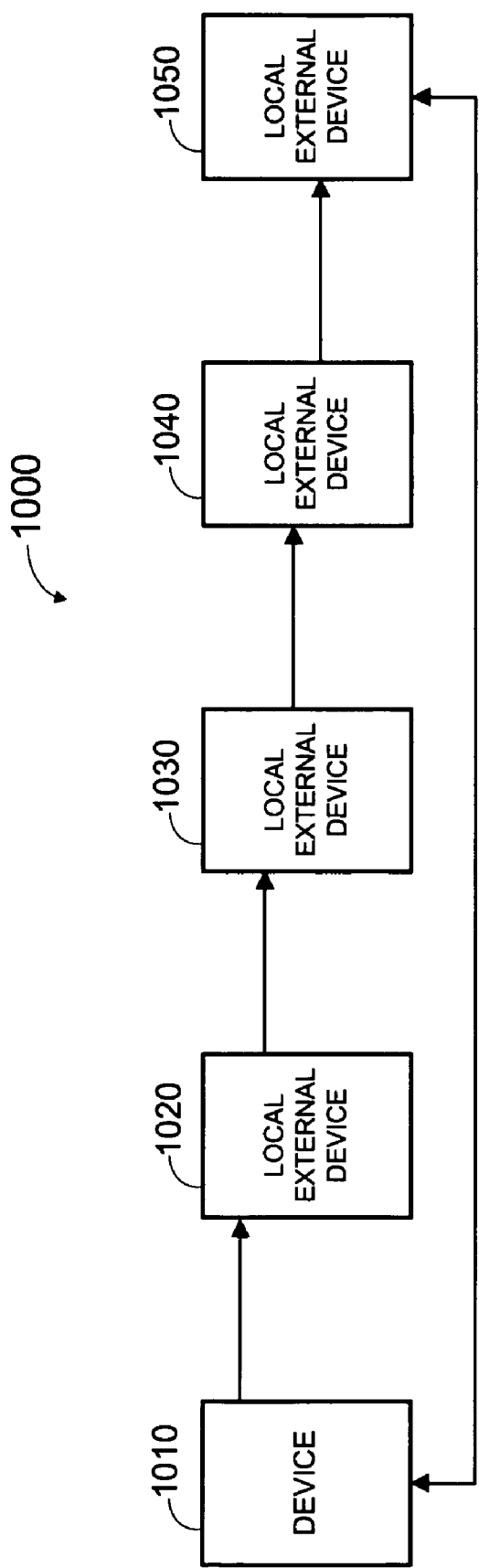
FIG. 14 is a block diagram of a system illustrating data passing according to some embodiments.

The data to be processed is transmitted to at least a first of the plurality of local external devices at step 160 of process 100. System 1000 of FIG. 14 shows how the data may be transmitted to the first local external device (i.e. device 1020) in the execution sequence at step 160. The first local device acts on the data and transmits the data or result to a next local external device (i.e., device 1030) in the execution sequence. The process continues thusly through devices 1040 and 1050. In some embodiments, a result of such processing may be returned to device 1010 from local external device 1050.

Figure 15:
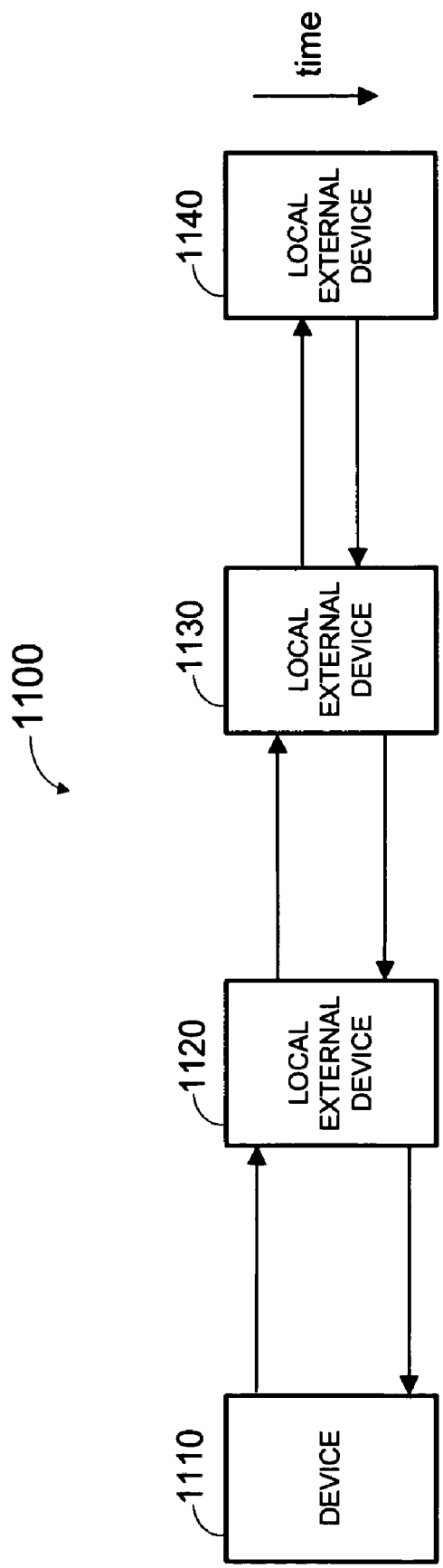
FIG. 15 is a block diagram of a system illustrating data passing according to some embodiments.

System 1100 of FIG. 15 illustrates step 160 according to other embodiments. As shown, the data may be transmitted in a set of nested function calls to the first of the plurality of local external devices. Results of the sub-services are thereby passed back to originating device 1110.

After the data has been transmitted, the execution sequence may be monitored at step 170 to detect occurrence of a sequence-modifying event. Such an event may include loss of communication with one of the local external devices, denial of service by one of the local external devices, detection of a newly-available service and/or local external device having preferred capabilities, or any other event due to which it may be desirable to modify the execution sequence. Flow returns to step 120 and continues as described above upon detection of such an event.

Device 2 may determine whether the execution sequence is complete at step 180 if no event is detected at step 170. Flow returns to step 170 if the execution sequence is not complete, and terminates if the execution sequence is complete.

Embodiments described above are not intended to be limited to the specific details set forth herein, but are intended to cover such alternatives, modifications and equivalents as can reasonably be included within the spirit and scope of the appended claims.

What is claimed is:

1. A method for a device, comprising:
receiving a command from a user;
determining a service desired by the user and to perform with respect to data stored in the device;
determining a plurality of sub-services corresponding to the service;
determining an execution sequence for the plurality of sub-services;
communicating the execution sequence to each of a plurality of local external devices, each of the plurality of local external devices to perform at least one of the plurality of sub-services in accordance with the execution sequence; and transmitting the data to at least a first of the plurality of local external devices;

wherein transmitting the data comprises transmitting a set of function calls including the data to the first of the plurality of local external devices, and wherein the function calls are nested in accordance with the execution sequence.

2. A method according to claim 1, wherein determining the plurality of sub-services comprises:

determining a set of sub-services available to the device from a set of local external devices; and determining the plurality of sub-services from the set of sub-services.

3. A method according to claim 2, wherein determining the plurality of sub-services further comprises:

determining sub-services provided by the device;

determining the plurality of sub-services based on the service, the set of sub-services, and the sub-services provided by the device.

4. A method according to claim 2, wherein determining the set of sub-services comprises:

executing a device and service discovery protocol in conjunction with the set of local external devices.

5. A method according to claim 1, further comprising:

determining unavailability of one of the plurality of local external devices;

determining a local external device to provide one or more sub-services to have been performed by the unavailable one of the plurality of local external devices;

determining a new execution sequence for the plurality of sub-services; and communicating the new execution sequence to the determined local external device and the plurality of local external devices to perform at least one of the plurality of sub-services in accordance with the new execution sequence.

6. A method according to claim 1, wherein communicating the execution sequence to each of the plurality of local external devices comprises:

communicating the execution sequence to one of the plurality of local external devices, wherein the one of the plurality of local external devices is to communicate the execution sequence to one other of the plurality of local external devices.

7. A device comprising:

a processor;

a memory storing program code executable by the processor to cause the device to:

receive a command from a user;

determine a service desired by the user and to perform with respect to data stored in the device;

determine a plurality of sub-services corresponding to the service;

determine an execution sequence for the plurality of sub-services;

communicate the execution sequence to each of a plurality of local external devices, each of the plurality of local external devices to perform at least one of the plurality of sub-services in accordance with the execution sequence; and transmit the data to at least a first of the plurality of local external devices;

wherein the program code executable by the processor to cause the device to transmit the data comprises:

program code executable by the processor to cause the device to transmit a set of function calls including the data to the first of the plurality of local external devices, and wherein the function calls are nested in accordance with the execution sequence.

8. A device according to claim 7, wherein the program code executable by the processor to cause the device to determine the plurality of sub-services comprises:

program code executable by the processor to cause the device to:

determine a set of sub-services available to the device from a set of local external devices; and determine the plurality of sub-services from the set of sub-services.

9. A device according to claim 8, wherein the program code executable by the processor to cause the device to determine the plurality of sub-services further comprises:

program code executable by the processor to cause the device to:

determine sub-services provided by the device; and determine the plurality of sub-services based on the service, the set of sub-services, and the sub-services provided by the device.

10. A device according to claim 8, wherein the program code executable by the processor to cause the device to determine the set of sub-services comprises:

program code executable by the processor to cause the device to:

execute a device and service discovery protocol in conjunction with the set of local external devices.

11. A device according to claim 7, the program code further executable by the processor to cause the device to:

determine unavailability of one of the plurality of local external devices;

determine a local external device to provide one or more sub-services to have been performed by the unavailable one of the plurality of local external devices;

determine a new execution sequence for the plurality of sub-services; and communicate the new execution sequence to the determined local external device and the plurality of local external devices to perform at least one of the plurality of sub-services in accordance with the new execution sequence.

12. A device according to claim 7, wherein the program code executable by the processor to cause the device to communicate the execution sequence to each of the plurality of local external devices comprises:

program code executable by the processor to cause the device to:

communicate the execution sequence to one of the plurality of local external devices, wherein the one of the plurality of local external devices is to communicate the execution sequence to one other of the plurality of local external devices.

* * * * *